UNITED STATES PATENT OFFICE.

HOWARD W. MATHESON, OF WILMINGTON, DELAWARE, ASSIGNOR TO E. I. DU PONT DE NEMOURS AND COMPANY, OF WILMINGTON, DELAWARE, A CORPORATION OF DELAWARE.

PROCESS OF FIREPROOFING AND PRODUCTS THEREOF.

1,309,581.     Specification of Letters Patent.     Patented July 8, 1919.

No Drawing.     Application filed December 13, 1915. Serial No. 66,463.

*To all whom it may concern:*

Be it known that I, HOWARD W. MATHESON, of Wilmington, in the county of New Castle, and in the State of Delaware, have invented a certain new and useful Improvement in Processes of Fireproofing and Products Thereof, and do hereby declare that the following is a full, clear, and exact description thereof.

My invention relates particularly to a process of rendering surfaces fireproof, and the product thereof.

My invention relates more particularly, however, to the fireproofing of surfaces having a coating of nitrocellulose.

Heretofore, nitrocellulose has been used as the particular constituent in coatings for artificial leather, aeroplane wings, etc., where the properties of tensile strength, elasticity, and windproofing are desired. Other materials cannot be successfully substituted provided with these desirable qualities. One objection to the use of such coatings is, however, their inflammability. This is especially true in the case where such coatings are used on aeroplane wings, as aeroplane wings are so located as to frequently have sparks from the engine come into contact with the same. In view of this fact, attempts have been made to substitute other materials for nitrocellulose in such coatings. Cellulose acetate has, for example, been suggested for this purpose, but owing to the brittleness of coatings produced with this material, this substitution for nitrocellulose has been without success. Various varnishes have also been tried, but these are not sufficiently fire-resistant to be of practical value in this connection.

The object of my invention is to provide a coating for surfaces which will not have the above disadvantages. I have found if a thin coating of a condensation product of phenol and formaldehyde in a suitable solvent is applied to a surface to which a nitrocellulose coating has been applied, the surface is rendered, in this way, very resistant to ignition from sparks.

While my invention is capable of embodiment in many different forms, I shall describe only one form thereof herein.

My invention may, for example, be carried out as follows:

A quantity of a condensation product of phenol and formaldehyde, as, for example, bakelite, condensite, etc., is dissolved in a suitable solvent, a solvent being preferably chosen, however, which is also a solvent for nitrocellulose, so as to thereby obtain a coating anchorage. In practice, the condensation product is preferably dissolved in a solvent of the same, and to this is added a quantity of a solvent for both the condensation product and pyroxylin, such, for example, as acetone, ethyl acetate, amyl acetate, etc. The solution thus obtained is brushed over the inflammable surface containing pyroxylin, and when the solvents have evaporated there is left a fire-resistant film which cannot readily be ignited by surface ignition, as, for example, sparks. A concrete example of my invention may be carried out in the following manner: Aeroplane wings of strong linen fabric, stretched over a frame work, are coated with several coats of a pyroxylin solution having the following constituents in the proportions given:

| | |
|---|---|
| Pyroxylin | 6% |
| Alcohol | 20% |
| Benzol | 40% |
| Ethyl acetate | 34% |

This contracts the linen and draws it taut, and renders the material waterproof, windproof, etc. The wings are then given two coats of the following composition:

50 parts bakelite varnish containing 55% solid bakelite, a condensation product of phenol and formaldehyde, dissolved in 25% alcohol and 20% benzol; 35 parts ethyl acetate; 15 parts of 100% benzol; 10 parts castor oil. In this composition, castor oil is not absolutely necessary, but is advantageous as it imparts a certain amount of flexibility to the film, and instead other oils may be used, as, for example, rape seed oil, linseed oil, corn oil, etc.

While I have described my invention above in detail, I wish it to be understood that many changes may be made therein without departing from the spirit of my invention.

I claim:

1. The process of rendering a surface having a nitrocellulose coating fire-resistant which comprises applying a coating of a condensation product of phenol and formaldehyde.

2. The process of rendering a surface having a nitrocellulose coating fire-resistant which comprises applying a coating of a lacquer of a condensation product of phenol and formaldehyde.

3. The process of rendering a surface having a nitrocellulose coating fire-resistant which comprises applying a coating of a condensation product of phenol and formaldehyde, and an oil.

4. The process of rendering a surface having a nitrocellulose coating fire-resistant which comprises applying a coating of a lacquer of a condensation product of phenol and formaldehyde and an oil.

5. The process of rendering a surface having a nitrocellulose coating fire-resistant which comprises applying a coating of a condensation product of phenol and formaldehyde, the coating of the condensation product containing a solvent of the nitrocellulose and the condensation product.

6. The process of rendering a surface having a nitrocellulose coating fire-resistant which comprises applying a coating of a lacquer of a condensation product of phenol and formaldehyde, the coating of the condensation product containing a solvent of the nitrocellulose and the condensation product.

7. The process of rendering a surface having a nitrocellulose coating fire-resistant which comprises applying a coating of a condensation product of phenol and formaldehyde, and an oil, the coating of the condensation product containing a solvent of the nitrocellulose and the condensation product.

8. The process of rendering a surface having a nitrocellulose coating fire-resistant which comprises applying a coating of a lacquer of a condensation product of phenol and formaldehyde and an oil, the coating of the condensation product containing a solvent of the nitrocellulose and the condensation product.

9. A covering comprising a coating of nitrocellulose and a condensation product of phenol and formaldehyde.

10. A covering comprising a coating of nitrocellulose and a condensation product of phenol and formaldehyde, the condensation product comprising a separate layer covering the nitrocellulose.

11. A covering comprising a coating of nitrocellulose and a condensation product of phenol and formaldehyde, the condensation product containing a quantity of oil and comprising a separate layer covering the nitrocellulose.

In testimony that I claim the foregoing I have hereunto set my hand.

HOWARD W. MATHESON.

Witnesses:
CHARLES E. ARNOLD,
JOHN C. EMHARDT.